Dec. 5, 1933.  E. H. ALDEBORGH ET AL  1,937,936
DIAL INDICATOR GAUGE
Filed June 30, 1928   2 Sheets-Sheet 1
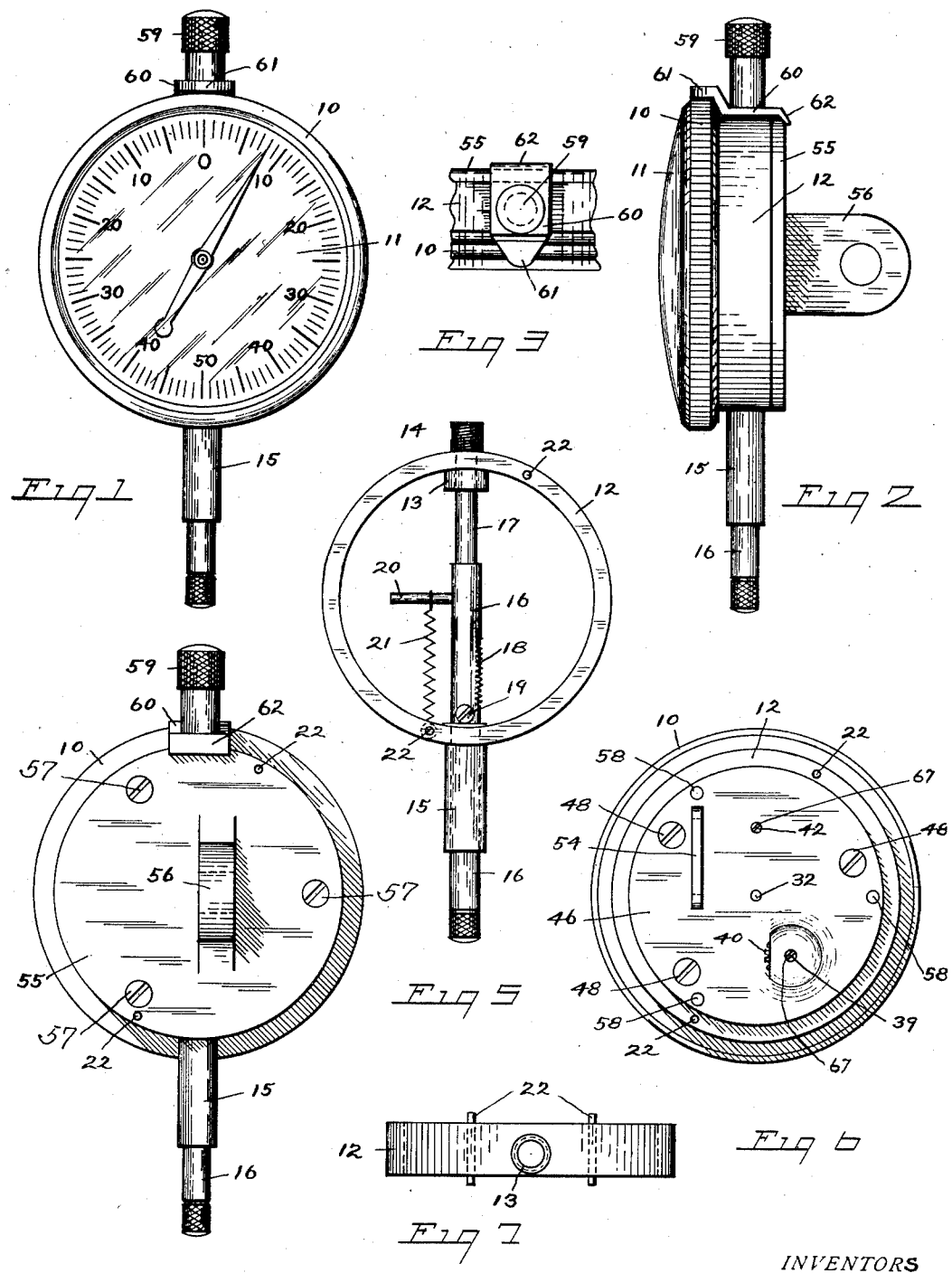
INVENTORS
Erik H. Aldeborgh
C. Eugene Ruf
BY
John J. Thompson
ATTORNEY Dec. 5, 1933.  E. H. ALDEBORGH ET AL  1,937,936
DIAL INDICATOR GAUGE
Filed June 30, 1928  2 Sheets-Sheet 2
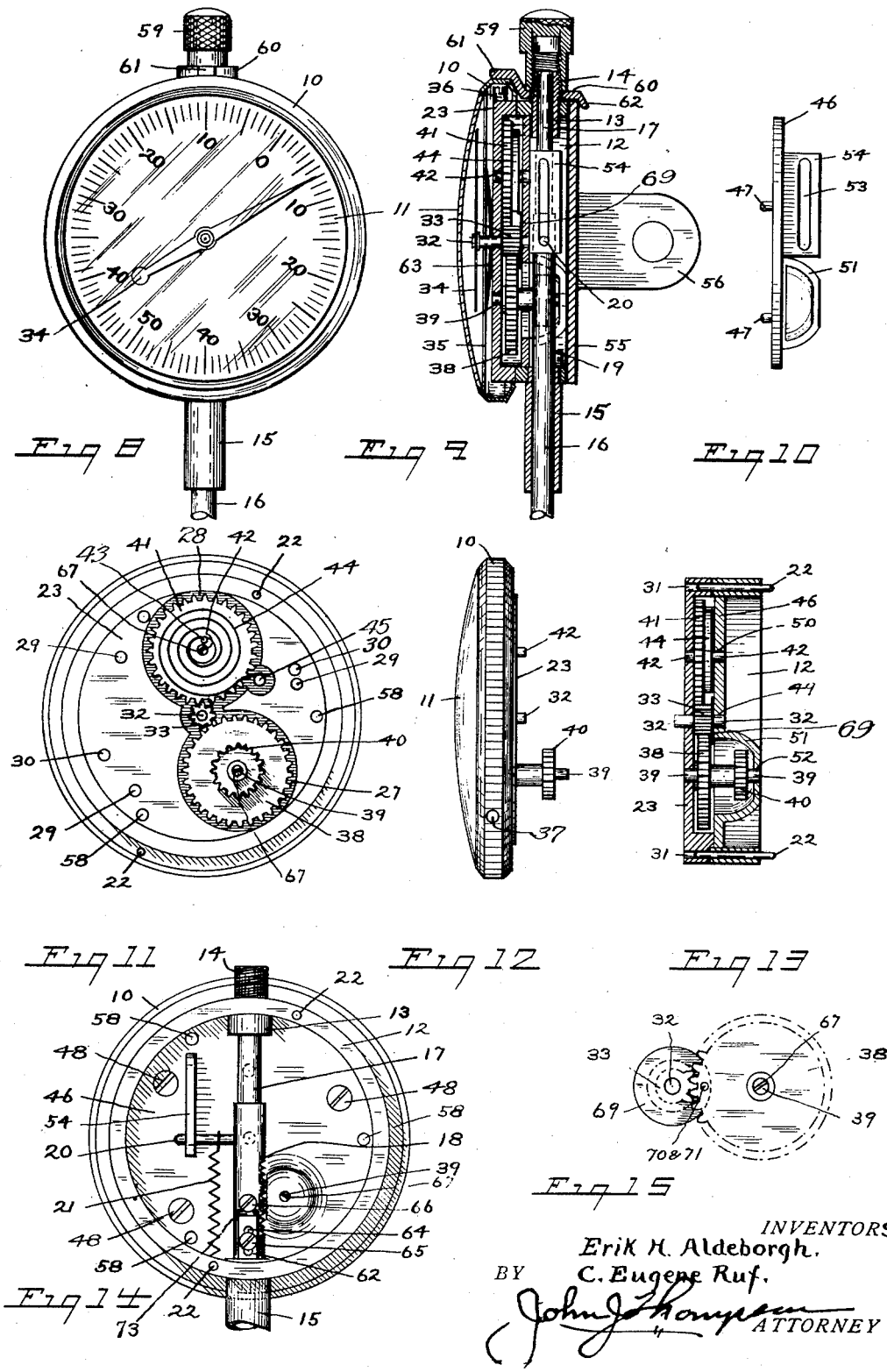
INVENTORS
Erik H. Aldeborgh,
C. Eugene Ruf,
BY John J. Thompson
ATTORNEY Patented Dec. 5, 1933

1,937,936

UNITED STATES PATENT OFFICE 1,937,936

DIAL INDICATOR GAUGE

Erik H. Aldeborgh and Christian Eugene Ruf, Poughkeepsie, N. Y., assignors to Standard Gage Company, Inc., Poughkeepsie, N. Y., a corporation of New York Application June 30, 1928. Serial No. 289,488

6 Claims. (Cl. 33—172)

This invention relates to a gauge of the dial indicator type, and comprises many novel features not before found in this class of instrument.

In the construction of most dial indicators now in use, the operating mechanism is so constructed that it is impossible to renew the main drive gear without dissembling the entire instrument, and also the main drive and the device for eliminating back lash or lost motion in the train of gearing, is so combined with the driving gear that it also has to be renewed with the driving gear thus making an expensive renewal, and requiring skill in its replacement, or that the instrument be returned to the factory for such repairs.

Furthermore in some dial indicators where the dial is adjustable with relation to the zero position of the hand, there is no provision made for locking the dial in position, nor is there any guard or cover provided for the upper end of the plunger bearing, or protection for the working parts of the instrument from dirt and moisture.

The objects of the present invention are to provide an instrument of this class that shall contain few parts, be simple and positive of action and strong to withstand hard usage and still retain its accuracy.

Another object of the invention is to provide a gauge in which the working parts are made up of units, each independent of the other and yet assembled into a compact and simple instrument of small dimensions.

Still another object being to so construct a dial indicator that the working parts shall be enclosed and protected from foreign matter.

A further object being to provide means whereby the dial may be adjusted and locked in position, and at the same time and by the same means the upper end of the tubular bearing for the plunger shall be covered and protected.

Another object being to provide a construction and arrangement of parts, whereby the main drive is arranged to be independent of the back lash preventing device so that it may be readily removed without dissembling the entire instrument, and also the entire driving assembly may be removed without disturbing either the dial or the hand and bezel, thus protecting the hand from damage at all times.

Another object being to provide means whereby the position of the hand may be set, without dissembling the instrument, only requiring the removal of the back plate.

Another object being to provide means for regulating the tension of the back lash preventing gear after the gearing has been assembled, this not only being important in the manufacture of the instrument, but also in regulating the tension desired.

Another object being to provide a dust cover for the gears which shall not only protect them from dust and dirt, but shall also act as a locating means for the body unit, and serve as bearings for the shafts; this in connection with the gear plate, which is counterbored for the gears, making a thin instrument capable of being usesd in places where a thicker instrument could not be employed.

In the drawings:—

Figure 1 is a front elevation of a dial indicator gauge embodying our construction.

Figure 2 is a side view of the same.

Figure 3 is a partial top view, to show the bearing cap, and dial locking device.

Figure 4 is a rear view of the indicator gauge.

Figure 5 is a detail view of the body and plunger unit.

Figure 6 is a rear view of the dial unit, and the drive unit in their combined assembly.

Figure 7 is a top plan view of the body unit as shown in Figure 5.

Figure 8 is a front elevation of the dial indicator, showing the dial in an adjusted position.

Figure 9 is a vertical sectional view of the instrument.

Figure 10 is a side view of the gear casing or cover.

Figure 11 is a rear view of the dial unit, and the gear assembly with the gear cover removed.

Figure 12 is a side view of the dial and gear assemblies as shown in Figure 11.

Figure 13 is a vertical sectional view of the body and gear assemblies.

Figure 14 is a view of the instrument with the back plate removed.

Figure 15 is an enlarged detail view of the pinion and drive gear, showing a novel method of setting the hand at zero in assembling the instrument.

Referring to the drawings:—

The instrument comprises, a dial unit or assembly, composed of the bezel ring 10, having the bezel 11 mounted therein, and also the dial 35, pointer 34, and dial tension spring 63; said bezel ring 10 being U-shaped in cross section; a body unit or assembly, composed of the ring 12, provided with the alined tubular bearings; the upper bearing 13 being shouldered within the wall of the ring 12, and provided with the external threads 14: while the lower tubular bearing 15 is secured within the wall of the ring 12 in some suitable manner such as by soldering; and within said bearings 13 and 15 is slidably mounted the plunger 16, which is reduced in diameter as at 17; and formed on one side with the rack 18, and provided with the stop screw 19 to limit its downward movement, and the pin 20 projecting from its side, and to which is secured one end of the spring 21, the other end of which is secured to the wall of the ring 12 in some suitable manner, such as the dowel pin 22, of which there are two placed in the wall of the ring 12 as shown.

The gear assembly, comprising a gear plate 23 having an outer diameter equal to the inside diameter of the back of the bezel ring 10, within which it fits; said gear plate 23 being formed with the bearings for the gear shafts, and is also counterbored as at 27 and 28 for said gears, and further provided with the tapped holes 29 for the dust case attaching screws; and the holes 30 for the dust case dowels 47, and the holes 31 for the dowels 22 of the body ring 12; the diameter of said gear plate 23 being the same as the outer diameter of the body ring 12.

Referring to Figures 9 and 12, within a bearing in the gear plate 23, is mounted a shaft 32, on the rear end of which is secured or formed the pinion 33, and to the front end of which is secured the hand 34 in the usual manner; the dial 35 being mounted in the bezel ring 10, and a spring 63 being placed between said dial 35 and the gear plate 23, to hold the dial within the ring 10, and produce tension between the ring 10 and the gear plate 23, the ring 10 is adjustably held with respect to the plate 23 by the screws 36 which are threaded into the edge of the plate 23, with their heads resting within the groove of the bezel ring 10, a hole 37 being provided for their insertion and removal; the object being to mount the bezel ring 10 on the plate 23 in such a manner that said bezel ring 10 and dial 35 may be turned with respect to the position of the hand 34.

Within the counterbore 27 is placed a spur gear 38, secured on a shaft 39, and in mesh with the pinion 33, and adapted to rotate the same; said gear 38 having an elongated shaft 39 on which is also secured a smaller spur gear 40, which is driven by the rack 18 on the plunger 16.

For preventing back lash between the pinion 33 and the drive gear 38, there is provided a compensating gear 41, mounted on a shaft 42, and in mesh with the pinion 33; and to the hub of said gear 41 at 43 is secured the inner end of a spiral spring 44, the outer end of which is secured by a pin 45 to the plate 23, thus tending to rotate said gear in one direction at all times to prevent lost motion between said pinion 33 and the drive gear 38.

For completing the gear assembly and for protecting the gears from dirt, etc., there is provided a dust casing or cover 46, of the same diameter as the inner diameter of the body ring 12, thus forming a locating shoulder therefor; and being located on the gear plate 23 by the dowels 47 secured therein and which enter the holes 30; while said cover 46 is retained in place by the screws 48 which are threaded into the holes 29; said cover 46 being formed with the bearings 49 and 50 for the shafts 32 and 42; and is also formed with the depression 51 to cover the gear 40, and a bearing 52 therein for the shaft 39; one side of the wall of said depression 51 being cut away to allow of the passage of the rack 18, which is in mesh with and rotates the gear 40; the plunger 16 being prevented from turning by the pin 20 which slides up and down within a slot 53 which is formed in a guide plate 54 which is secured to the cover 46.

In completing the assembly of the dial unit, the body unit and the gear drive unit, the back plate 55 which is provided with a lug 56 for attachment to a tool post, etc., is placed against the body ring 12, and located by the dowels 22, and secured by the screws 57, which are threaded into the holes 58 in the gear plate 23.

For covering the end of the tubular bearing 13, there is provided a cap 59 which is threaded thereon, and under said cap 59 is placed a clip 60, which is provided on its front end with a pointer 61 engaging the knurled edge of the bezel ring 10; and a rear end 62 engaging the back plate 55, in such a manner that by tightening said cap 59 the clip 60 will lock the bezel ring 10, from rotating, or in its adjusted position.

It will thus be seen that should it be desired to remove or renew the driving gear 38; in place of having to dissemble the entire instrument, it is only necessary to remove the back plate 55; the body assembly as shown in Figure 5, and the gear cover 46; when the drive gear 38 can be lifted out without disturbing in any manner the dial 35, hand 34, and bezel ring 10; also the entire gear unit, comprising the gear plate 23, gears 38 and 41, and cover 46 may be removed or replaced as a complete unit, by removing the bezel ring 10 and the hand 34.

In Figure 14 of the drawings, is illustrated a novel method of adjusting the position of the hand 34 with reference to the position of the plunger 16, which rotates the hand through the train of gearing employed.

In place of the stop screw 19, as used in the other figures to limit the downward movement of the plunger 16, there is provided a stop plate 62, which is formed with a beveled end 73 and an elongated hole 64; said plate 62 being secured to the side of the plunger 16 in an adjustable manner by the screw 65 placed in the hole 64 and threaded into said plunger 16; while the adjusting screw 66, is also threaded into said plunger with its head in contact with the beveled end 73 of said plate 62, in such a manner that the position of said plate 62 on the plunger 16 may be adjusted to regulate the position of the plunger when in its lowered or normal position and when the hand is at the zero mark on the dial.

Also referring to Figure 14 of the drawings, there are means shown for adjusting the tension of the compensating or back lash gear 41 and its operating spring 44, after the gear drive is assembled, which comprises a slot 67 formed in the end of the shaft 42, which may be engaged by a screwdriver for the purpose of turning said shaft and its attached gear 41 and spring 44, by removing the back plate 55, and disengaging the body unit and rack 18 from mesh with the gear 40, while said shaft 42 is given the required rotation to effect the proper tension of the spring 44.

A similar slot 67 may be placed in the end of the shaft 39, so that the tension of the gear 41 may be regulated through the train of gears if so desired.

In the assembling of all dial indicators, and especially in renewing the parts, the pinion gear to which the hand is attached, must be meshed with a certain tooth of the drive gear and rack, so that when the plunger is at its lowest position the hand will be exactly at the zero mark, and this is a very hard operation requiring great skill.

To obviate this, we have shown in Figure 15 a simple and positive method of locating the pinion teeth of the gears to bring into mesh, which comprises a plate or washer 69 which is secured to the pinion 33, and which is formed with a hole 70, which when the gears 33 and 38 are in proper mesh will register with a similar hole 71 formed in the gear 38; and if desired in the assembly of the instrument, a pin may be placed in these holes to retain the gears stationary while the hand 34 is being pressed in place on the shaft 32.

The tension of the spring 44 has no bearing on the position of the pointer with respect to the graduations on the dial as the gears can only be rotated as limited by the movement of the rack which is limited in turn by the stops.

The importance of the washer 69 and the placing of a temporary pin through the holes 70 and 71 is to locate the meshing of the proper teeth so that the pointer may be pressed upon its shaft in proper registry with the zero mark on the dial and the gears will not move during this assembly of the pointer, and this can not be accomplished without in some manner holding the train of gears from movement.

Having thus described our invention, what we claim as new and desire to secure by Letters Patent, is:—

1. A dial indicator gauge of the class described, comprising in combination with a dial unit having an indicator movable over a dial, a gear drive unit associated with the dial unit for actuating the indicator, a body member attached to said gear drive unit and formed with alined bearings, a contact plunger movably mounted in said bearings and formed with rack teeth drivingly associated with said gear drive and a gear casing secured to said body member and formed with an opening through which the gear drive meshes with the rack teeth.

2. A dial indicator gauge comprising a dial having an indicator movable over said dial, a gear drive member associated with the indicator for moving the same, a body member formed with alined bearings and secured to said gear drive member, a contact plunger movably mounted in said bearings and drivingly associated with the gear drive member, means for adjustably limiting the movement of said plunger and a back plate attached to said body member.

3. A dial indicator gauge comprising a dial unit having an indicator movable over a dial, a gear drive unit associated with the dial unit for actuating the indicator and comprising in part of a compensating gear and a spring for exerting force upon said gear in an operative direction of rotation, a body unit formed with alined bearings, a plunger movable in said bearings and drivingly associated with the gear drive unit through rack teeth formed thereon, said gear driven unit including means for adjusting the exerting force of said spring actuated compensating gear.

4. A dial indicator gauge comprising a dial unit having an indicator movable over a dial, a gear drive unit associated with the dial unit for actuating the indicator and comprising in part of a pinion shaft formed with a slotted end, a drive pinion mounted on said shaft and forming a part of drive unit and including a compensating gear and a spring for exerting rotative pressure upon said compensating gear in the direction of its operative rotation, a body unit formed with alined bearings, a contact plunger movably mounted in said bearings and formed with rack teeth in mesh with said drive pinion, said gear driven unit including means for adjusting the rotative pressure of said compensating gear.

5. A dial indicator gauge comprising a dial unit having an indicator movable over a dial, a gear drive unit detachably associated with the dial unit for actuating the indicator member and comprising in part of a combined gear cover and bearing plate, said dial unit and said gear drive unit being rotatably adjustable to turn the dial with respect to the indicator, a body unit formed with alined bearings and a plunger movably mounted in said bearings and drivingly associated with the gear drive unit, one of said alined bearings having a threaded extension, a connector clip member bridging said units, and means threaded on said extension for closing said bearing and cooperating with said connector clip for locking the several units in operative relation.

6. A dial indicator gauge comprising a dial unit having an indicator movable over a dial, a gear drive unit detachably associated with the dial unit for actuating the indicator member, said dial unit and said gear drive unit being rotatably adjustable to turn the dial with respect to the indicator, a body unit formed with alined bearings and a plunger movable in said bearings and drivingly associated with the gear drive unit, one of said alined bearings having a threaded extension, a connector clip member bridging said units, and means threaded on said extension for closing said bearing and cooperating with said connector clip member for locking the several units in operative relation.

ERIK H. ALDEBORGH.
C. EUGENE RUF.